Figure 1:
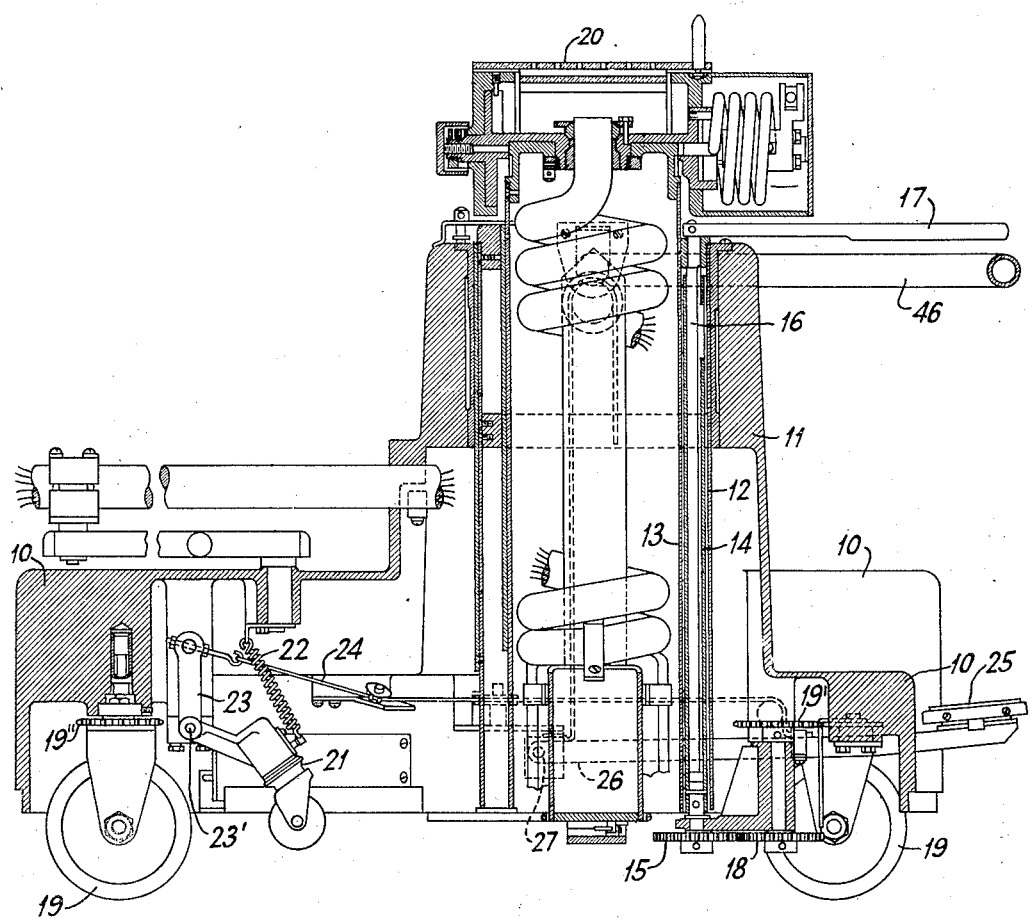

May 14, 1940. A. V. BEDFORD ET AL 2,200,736
CAMERA SUPPORTING PEDESTAL
Original Filed Nov. 5, 1936 3 Sheets-Sheet 1

INVENTORS
ALDA V. BEDFORD AND
BY KNUT J. MAGNUSSON
ATTORNEY

May 14, 1940.  A. V. BEDFORD ET AL  2,200,736
CAMERA SUPPORTING PEDESTAL
Original Filed Nov. 5, 1936  3 Sheets-Sheet 2
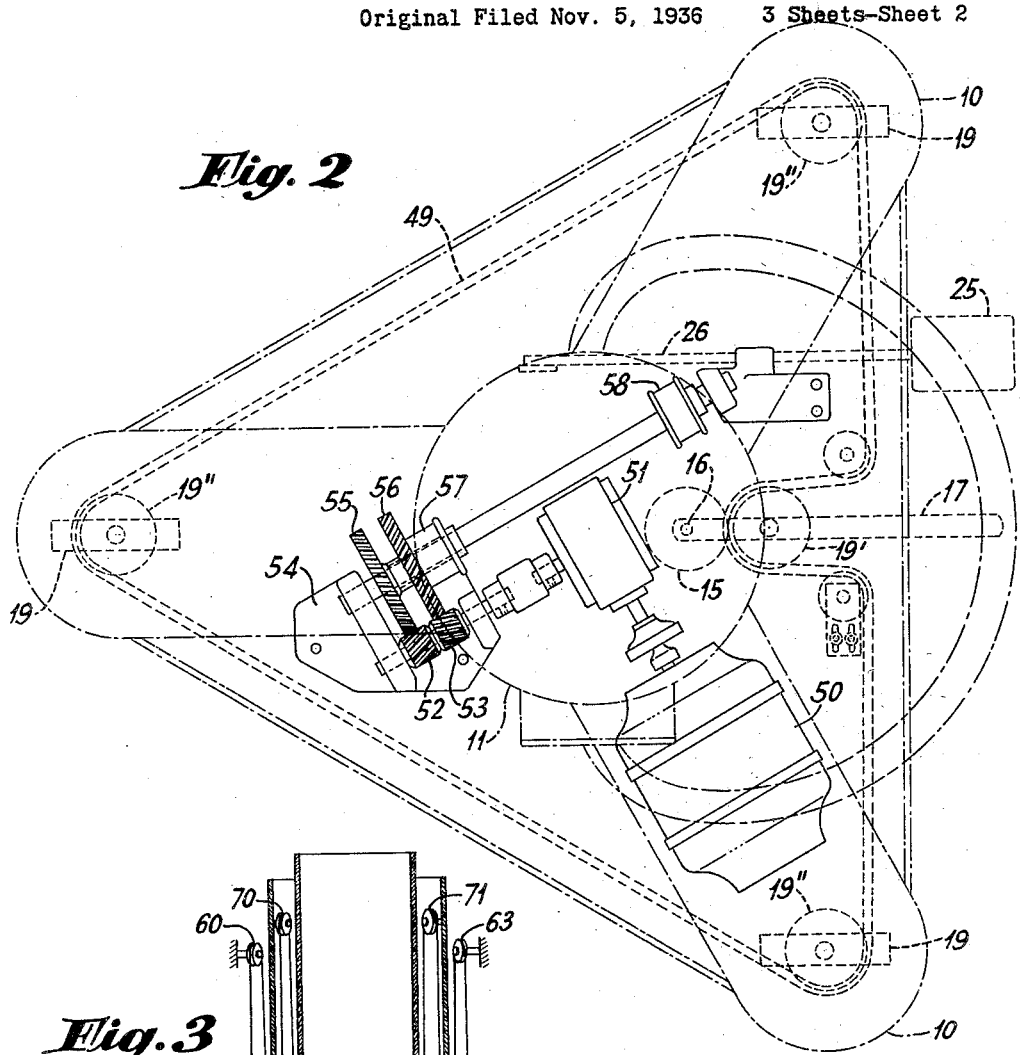
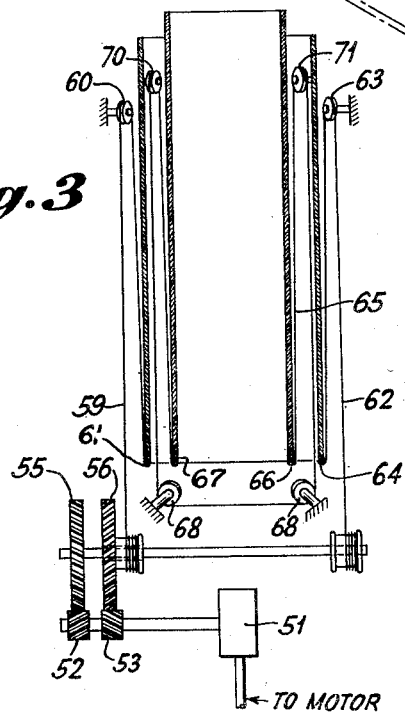
INVENTORS
ALDA V. BEDFORD AND
BY KNUT J. MAGNUSSON
ATTORNEY

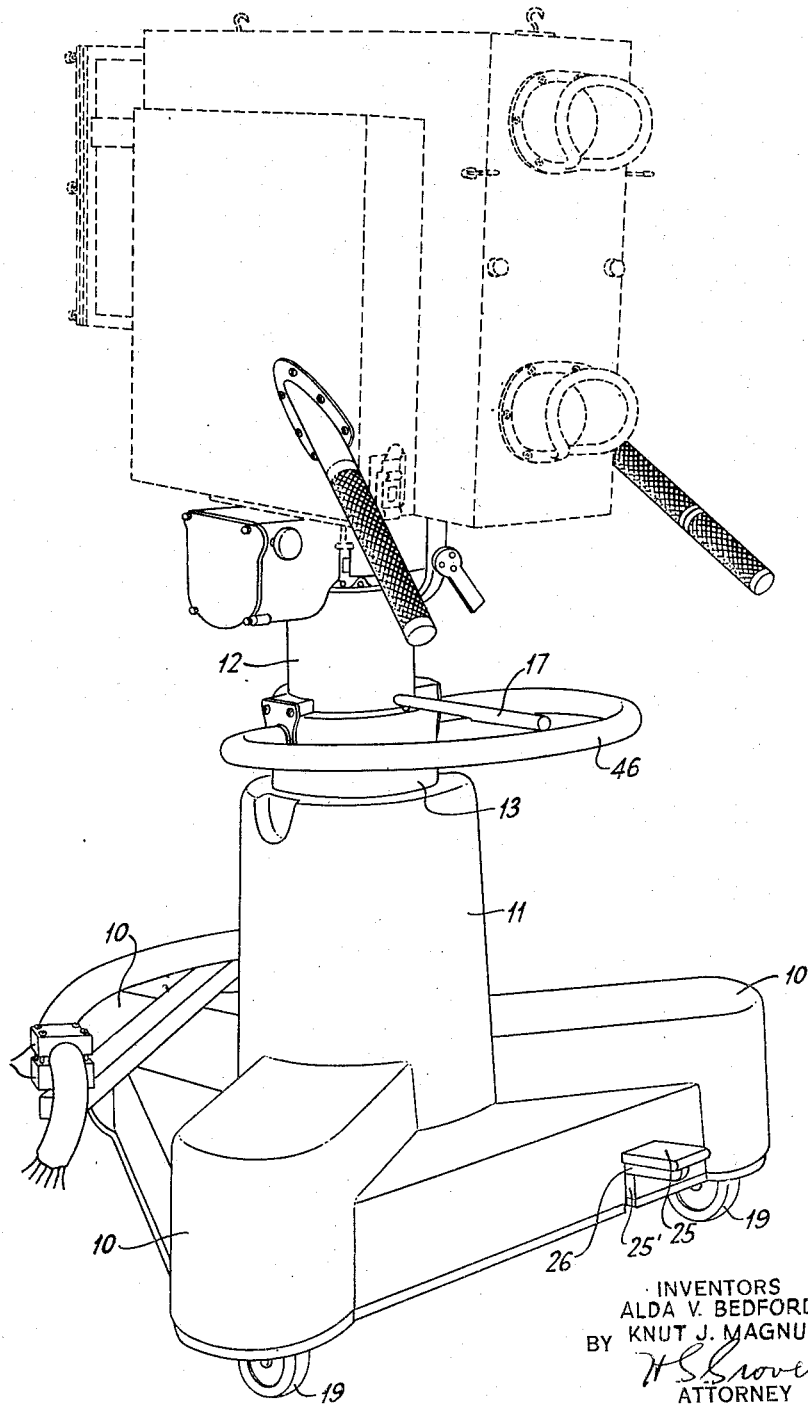

Patented May 14, 1940

2,200,736

UNITED STATES PATENT OFFICE 2,200,736

CAMERA SUPPORTING PEDESTAL

Alda V. Bedford, Collingswood, and Knut J. Magnusson, Merchantville, N. J., assignors to Radio Corporation of America, a corporation of Delaware Original application November 5, 1936, Serial No. 109,390. Divided and this application September 30, 1937, Serial No. 166,478

4 Claims. (Cl. 280—48)

The present invention is a division of our application Serial No. 109,390, filed November 5, 1936, and relates to television camera structures and particularly to that portion of the camera which is known in the art as a television camera dolly and which is used to carry or support the camera equipment by which the optical image is converted into electrical signals which at receiving points produce an electro-optical representation of the subject at the transmission point.

It has long been established from the motion picture industry that for the purpose of changing from remote to close-up shots or vice versa or for the purpose of tilting or changing from a low viewing point of the subject to an elevated viewing point or for the purpose of obtaining panoramic views, it is desirable to provide ways and means by which the film taking equipment can be moved about from place to place in order to accomplish these ends in a most suitable and convenient manner.

However, many reasons present themselves for making such known forms of motion picture apparatus not satisfactory or suitable for television practice. Among the difficulties which present themselves in television practice are those which are due to the necessity of a great number of electric cables connected to the camera device. Also, apparatus of this nature must be entirely free as well as shielded from both electrical and audible disturbances which would otherwise spoil or ruin the resultant picture and/or sound transmission. In addition, compact apparatus is desirable in order to lend more flexibility to development trends since compactness of apparatus which includes all necessary control features permits full and complete control by a single operator.

The features of the camera equipment per se are described and claimed in a co-pending application filed by the present inventors on even date herewith. In the co-pending application, the relationship between the view finding and focussing arrangements, the internal cabinet construction and the camera per se, and other related features, have been described and claimed. The present invention is, however, directed more particularly to the manner by which the camera equipment may be moved about from place to place and set and adjusted to such positions as to provide for obtaining all desired types of views.

In general, the subject matter of the present invention is directed to the apparatus and means for providing different elevations of the television camera equipment. It is also concerned with suitable arrangements to provide for the taking of panoramic views and tilting of the taken view to different angles. The camera equipment itself is heavy, and suitable ways and means are provided to compensate for the shifting of the camera weight due to tilting. In motion picture practice, it has been customary to provide a counterbalancing boom to balance the weight of the tilted camera but with television camera equipment which can be controlled by a single operator such type construction is not desirable. Accordingly, this invention provides resilient or mechanical means to compensate and equalize any shifting of the camera weight with respect to the axis of support so that the camera shall at all times be perfectly balanced irrespective of its position of tilt.

In addition, ways and means for steering and controlling the path of movement of the television camera dolly or supporting pedestal equipment are herein disclosed. Further, the invention includes in addition suitable means for propelling the camera dolly from place to place as well as a means for insuring against any possible interference during such motion from the excessive number of electrical cables necessary to operate electrical equipment of the nature herein described.

In any equipment for moving camera equipment and permitting rapidly changing the transmission from one scene to another, it is desirable to provide easily accessible means for elevating and lowering the camera equipment and to provide with such means a simple, rapidly acting and sensitive control of the elevation. This control can suitably be provided as a part of the means for guiding and propelling the camera dolly from place to place and thus under the continual control of the operator.

In any apparatus of the nature herein described where there is a support element to be lifted and there are a considerable number of electrical cables connecting to the supported apparatus and passing in through the base of the supporting pedestal or dolly, suitable means to compensate for changing length of cables required must be provided. Accordingly, by the present invention provisions are made so that all electrical cable equipment connecting with the camera proper are coiled within the supporting and elevating pedestal or lift portion of the camera dolly, and changes in elevation affecting cable lengths are thus compensated.

Further, the present invention is so constituted as to provide ways and means by which the camera equipment may be steered from one position to another while still permitting the operator of the camera to watch continually the subject to be televised and at this time adjust the focus of the light image upon the light sensitive image transmitting tube without being required to watch continually the actual direction in which the camera equipment is being propelled. This is accomplished by interlocking the wheels upon which the pedestal or dolly is moved and at the same time arranging a steering lever so as to indicate the direction of travel.

In conjunction with the steering mechanism for moving the camera from place to place, suitable means to change the angle of direction of motion while still maintaining at all times a component of motion directly toward or away from the subject of which the image is to be transmitted, or, in other words, the path of motion is limited to a straight line.

The provision of the foregoing features are all included among the several other objects and advantages of the invention but other objects of course will become apparent and at once suggest themselves to those skilled in the art to which the invention is directed by reading the following specification and claims in connection with the several figures of the accompanying drawings wherein:

Fig. 1 is an elevation of the pedestal as seen on a cutting plane containing a major axis, Fig. 2 is a schematic plan view, Fig. 3 is a view of the elevating mechanism; and Fig. 4 is a perspective view.

The general shape of the pedestal may best be seen from the perspective shown in Fig. 4. In general, the pedestal is comprised of three radially extended arm members spaced 120° apart from each other and each extending radially from a vertically positioned housing containing a tubular shaped receptacle, the latter being used to accommodate the elevating telescoping mechanism. The arm members referred to are located at the base of the pedestal and are joined to each other by three plane faced triangularly shaped metallic members. Joined to each of the radial arm members is a supporting wheel having a sprocket attached thereto, the function of which will be explained hereinafter. The radial arm members are preferably hollowed except at their extremity where the sprocket wheel is accommodated, the hollow feature being used in order to make the arm form both a housing and support member for the apparatus for operating the steering means and for the elevating means which supports the object to be accommodated by the pedestal. Joined to the upright tubular receptacled member at the center of the pedestal is a tubular arm 46 extending around in a substantially semi-circular fashion and against which an operator may push in order to move the pedestal on its wheels or rest in pulling the camera in order to make smoother the actual movement, the pedestal being of a type which is particularly adaptable for the support of motion picture cameras, television cameras, etc., so that mobility plays an important part.

Referring to Fig. 1, the radial arm members 10 are joined to an upright housing 11 which is tubularly hollowed at its center portion, fitting into the tubular opening is a hollow first or outer tubular member 12 and a second or inner hollow tubular member 13. The tubular members and receptacle are in this particular case cylindrically shaped, but it will be appreciated that their shape might be other than circular, such as rectangular, hexagonal, or the like. The two tubular members 12 and 13 form the telescopic elevating mechanism for the plate 20 to which the object to be supported by the pedestal is secured.

Spaced between the first and second tubular members 12 and 13 respectively is a hollow tube shaped member 14 which is joined at one extremity to a gear 15 and whose other extremity is supported in position between the two cylinders. This latter tubular member 14 is slotted, and inserted in the member is a keyed rod arm 16 which extends upwardly past the extremity of the first tubular telescopic elevating member 12 where it is joined to a lever arm 17. The gear 15 is placed in co-operative relationship to a driven gear 18 which is rigidly connected axially with one of the sprocket members 19′. The sprocket members 19″ on each of the wheels are joined together by a sprocket chain, not shown in this figure, and the gear arrangement 15, 18, the hollow slotted tube 14 and the keyed rod arm 16 and lever arm 17 form the steering mechanism to guide the pedestal during mobility.

The action of the steering mechanism of the exemplified form illustrated is as follows: It is highly desirable in a support structure for television camera usage, which is a primary purpose of this invention, to limit the path of movement substantially only to a straight line path in order to preclude the possibility of rotation of the camera away from the object to be televised while the actual transmission of image signals or "televising" is taking place. Again, it is desirable at times when televising a "shot" to so arrange the apparatus as to make possible obtaining a perspective or panorama view, herein called "panning." This would be particularly desirable for instance where a large group of people were to form the subject of transmission, and naturally, in a "close-up shot" all could not be within the field of view of the optical system, and so to obtain a close-up of each small group or individuals the television camera should be turned, or "panned," to include the desired portions of the large group.

By means of steering arrangement shown herein, the camera always faces the same direction regardless of the direction in which the pedestal is moved. The wheels 19, through an interlocking arrangement, are maintained with their axes permanently parallel each to the other. By the arrangement illustrated, the sprocket chain which serves to control the turning of the wheel axis about a vertical axis, serves as an interlocking member between the wheels. Upon turning the lever arm 17, the keyed member 16 will turn the slotted tubular member 14 which is joined at its extremity to the gear 15. This gear 15 will then turn the gear 18 which causes the sprocket of one of the wheels to turn and, due to the connecting sprocket chain between this wheel and each of the other wheels, the chain movement causes each wheel to turn just sufficiently to keep their axes parallel to that of the turned wheel. Thus with a suitable initial parallel axes adjustment of the several wheels, it is clear that the device can move only in a direction at right angles to the axes of these wheels. Since there is a chain link connecting the driving pinion or gear 15 with the driven pinion or gear to cause the various sprocket wheels fixedly mounted on the supporting spindle for each wheel axis to turn, it is clear that unless suitable means for adjusting the position of one of the wheels relative to the other two is provided, the chain length as determined by the various links could easily be such that a slight degree of slippage between various wheel elements might be present. Accordingly, suitable means is provided by supporting the spindle carrying the yoke member to support the front wheel for sliding this yoke to a position where the chain is at all times kept tight. One suitable means for accomplishing this result is through the adjustment of the positioning screw to move the wheel yoke both forward and with a slight degree of rotation.

It was above explained that there is a driving and driven pinion or sprocket wheel forming a part of the driving arrangement for moving the sprocket chain. It will be obvious that the use of the driven gear or sprocket wheel is for the purpose of reversal of the direction of rotation or movement of the driven chain. When this has been provided, the steering rod 17, if turned (shown particularly by Fig. 2) will indicate immediately the direction toward which the pedestal member will move and, at the same time, maintain the steering rod 17 always in a position perpendicular t the axes of the several wheels. With this arrangement the operator of the television camera equipment by setting the position of the steering rod 17 so that it points at the desired subject or part of the subject of which it is desired to transmit at any instant the image when the camera equipment itself is moved toward or away from that subject or part of the subject, the camera will move only along a straight path of travel. The operator's attention, therefore, can be directed solely to maintaining the proper focusing of the subject on the mosaic electrode of the transmitting tube and upon the optical viewing plane, as explained in the copending application above noted.

It is desirable, of course, that some means be had to rotate the pedestal structure when desired, since the path of motion otherwise would be restricted solely to straight line motion due to the interlocking of the wheels and the pedestal with its supported structure could not conveniently be moved from place to place or faced in different directions without further adjustable features. For this purpose there is provided a castor member 21 which is normally kept in a retracted position by spring 22 so as to be out of contact with the surface upon which the rollers 19 rest. The normally retracted castor 21 is supported by a bellcrank lever 23 pivoted to the frame at 23'. Joined to the bellcrank lever for the purpose of turning it about the pivot point 23' is a cable member 24 which passes over a succession of pulleys so positioned that the cable will clear all apparatus contained in the pedestal base. The cable connects at the end remote from the connection to the bellcrank lever 23 with a lever connected with a treadle member or a foot pedal 25 carried in one of the radial arms of the base. This foot pedal is joined to the lever arm 26 which has its fulcrum at a point 27. Accordingly it will be seen that when the foot pedal 25 and lever arm 26 are pressed downwardly in a positioning slot 25' in the supporting base member, the cable 24 is retracted and the bellcrank arm is turned about its pivot point. As the combination of the bellcrank arm and castor are greater in length from their mounting position than the sprocket wheel 19 and associated immediately adjacent thereto, the radial arm to which the castor is joined will be forced upwardly and the sprocket wheel 19 is taken out of contact with the supporting surface. The freely rotating castor and rollers then form the support for that radial arm. This castor member preferably is located at the front of the pedestal, and on the side opposite that from which the operator of the supported television camera device controls the operation. In motion picture and television work this forms an important feature.

Referring to Fig. 2, there is shown a view in which the radial arms 10 and their plane faced joining members are illustrated in a phantom manner in order to bring out more clearly the relative positions of the various elements of the pedestal. The driving mechanism which elevates and lowers the telescoping tubular members is set forth boldly while the other elements are shown in a phantom manner.

The arrangement comprising the steering arm 17 and co-operation of the gears controlled thereby is brought out clearly in this figure and it will be obvious that the direction of motion of the sprocket chain 49 will be the same as the direction in which the steering arm is moved. Hence, the operator of the device by merely pointing the arm in the direction in which he wishes the pedestal to move definitely, establishes the exact line the pedestal will be carried forward or backwards, as the case may be. This particularly simplifies the control of the device and in view of the fact that the pedestal is adapted to be operated by one operator, simplicity of control, as well as accuracy, is a highly desirable feature.

The elevating and lowering means are set forth clearly both by Figs. 2 and 3. The actual operation of the device will be explained with particular reference to Fig. 3, although a further understanding of the interrelation of the parts can be had by concurrent reference to Fig. 2. A motor 50 having the shaft thereof connected so as to drive a speed reduction unit 51, is mounted in one of the radial members 10 of the pedestal base. The motor itself, as to direction of rotation and operation, is controlled by the operator by means of one of the rotatable handles shown in the perspective view of Fig. 4. The motor is of the type which can be reversed readily by changing, for example, the direction of current flow through the coils, as is known in the art, or, for example, by changing one phase of the windings. The handle member serves as the control means for the motor and is so arranged as to close the motor and when in one position to cause the motor to rotate clockwise, for example, while in the other extremity of position of the handle it is arranged to cause the motor to rotate in a counter-clockwise direction. The speed of rotation may also be varied, if desired, by changing the resistance in the motor circuit in accordance with the angular rotation of the handles from a normal zero angle position.

Two gears 52 and 53 are mounted on the motor shaft and are supported in bearings carried by a mounting member 54. As shown by the drawings, the teeth on each of these gears are cut at an angle to the major axis of the gear and that the direction of cut of the two gears is reversed with respect to each other. These two gears are in driving relationship with two other driven gears 55 and 56. The gears 55 and 56 are mounted co-axially but gear 56 is shown as mounted fixedly with respect to windlass 57, whereas, the gear 55 while definitely spaced from the gear 56, is mounted on a shaft which has no co-operation with the windlass 57 but which is arranged to rotate a second windlass 58. The two gears 55 and 56 are mounted so as to be slidable axially, that is to say, their shafts may vary in position in their bearings by sliding further into the bearing or pulling out in a direction away from the bearing surface.

Referring to Fig. 3, there is shown schematically the complete elevating and lowering mechanism. The two driving gears 52 and 53 are shown co-operating with the driven gears 55 and 56. A cable section 59 has one end secured to the windlass driven by the gear 56. The cable which is arranged to be wound upon and unwound from the windlass when the windlass is rotated by the driving gears, passes from the windlass over a pulley member 60 fixedly supported by the pedestal frame. The other end of the cable is fastened at 61 to the outer elevating tubular member 12. Similarly, a second cable section 62 arranged to be wound upon and unwound from the windlass 58 when it is rotated in clockwise or counter-clockwise direction passes from the windlass over a fixed pulley 63 and is fastened at a position 64 to the outer elevating tubular member 12. In general, the position of the fastening element at 61 is diametrically opposite that of the fastening element at 64, the purpose being to form a lift arrangement for the outer tubular member on opposite sides thereof so as to maintain a force equalizing the vertical lifting of the tubular lift member.

It has been stated that the two gears 55 and 56 were arranged to slide axially in the support bearing members. This forms an important feature of the arrangement since any inequalities in the length of the cable sections due to imperfect assembly, slipping or stretching will cause differences in tension in the different sections and in the absence of balancing means binding of the tubular member would result. Accordingly, the force on the gears being unequal, the gears will slide axially to a position where the force is equalized and each gear will assume an equal share of the full load.

A cable member 65 is joined at two positions 66 and 67 to the inner telescoping tubular member. From the position 67 the cable passes over a pulley 70 fastened to the outer tubular member 12, thence around two pulleys 68 which are fixedly mounted in the pedestal framework back over another pulley 71 and back to where it is joined to the inner tubular member at 66. Accordingly, it will be seen that as the outer tube rises, the cable will be drawn over pulleys 70 and 71 and will lift the inner tubular member with respect to the outer tubular member, thus forming a telescopic lift arrangement in which both elements of the telescope rise simultaneously.

When it is desired to lower the pedestal, the cable sections on the windlasses are unwound and gravity effects the lowering of the tubular members.

Referring to Fig. 4, there is shown a perspective view of the pedestal in a bold arrangement and a perspective of the camera which it is adapted to support as a phantom arrangement in order to give a complete view of the entire arrangement.

What we claim is:

1. In a mobile supporting pedestal structure wherein the object to be supported is secured to a supporting member carried upon the pedestal, a plurality of wheels for supporting said pedestal, a sprocket mounted on each of said wheels, a single sprocket chain for interlocking and simultaneously rotating the sprockets on said wheels, and steering means for rotating the sprocket chain so as to control in accordance with the displacement from normal the position of the axes of said wheels, said latter means including a manually operable linear arm member, the arm member being positioned so that the path of travel of the pedestal is along the continuation of the line formed by said arm member.

2. In a mobile supporting pedestal structure wherein the object to be supported is secured to a supporting member carried upon the pedestal, a plurality of wheels for supporting said pedestal, a sprocket mounted on each of said wheels, a sprocket chain for interlocking said wheels, means for driving the sprocket chain so as to control the position of the axes of all of said wheels comprising a sprocket, a slotted tubular member connected to said sprocket, a keyed member slidably mounted in said slotted tubular member, and a lever arm joined to said keyed member.

3. In a mobile supporting pedestal structure wherein the object to be supported is secured to a supporting member carried upon the pedestal, a plurality of wheels for supporting said pedestal, a sprocket mounted on each of said wheels, a sprocket chain for interlocking said wheels, means for driving the sprocket chain so as to control the position of the axes of said wheels, comprising a sprocket, a driven gear fixedly mounted with respect to said sprocket on said sprocket axle, a driving gear for driving said driven gear, a slotted tubular member fixedly joined to said driving gear, a keyed member slidably mounted in said slotted tubular member, and a lever arm joined to said keyed member in a position substantially perpendicular to the axes of said wheels.

4. In a mobile supporting pedestal structure wherein the object to be supported is secured to a supporting member carried upon the pedestal, a plurality of wheels for supporting said pedestal, a sprocket mounted on each of said wheels, a sprocket chain for interlocking said wheels, means for driving the sprocket chain so as to control the position of the axes of said wheels, comprising a sprocket, a driven gear fixedly mounted with respect to said sprocket on said sprocket axle, a driving gear for driving said driven gear, a slotted tubular member fixedly joined to said driving gear, a keyed member slidably mounted in said slotted tubular member, a lever arm joined to said keyed member in a position substantially perpendicular to the axes of said wheels, said lever arm being elevated and maintained in a position substantially perpendicular to the axis of the wheels in accordance with the elevation of the supporting pedestal wall.

ALDA V. BEDFORD.
KNUT J. MAGNUSSON.